Figure 1:
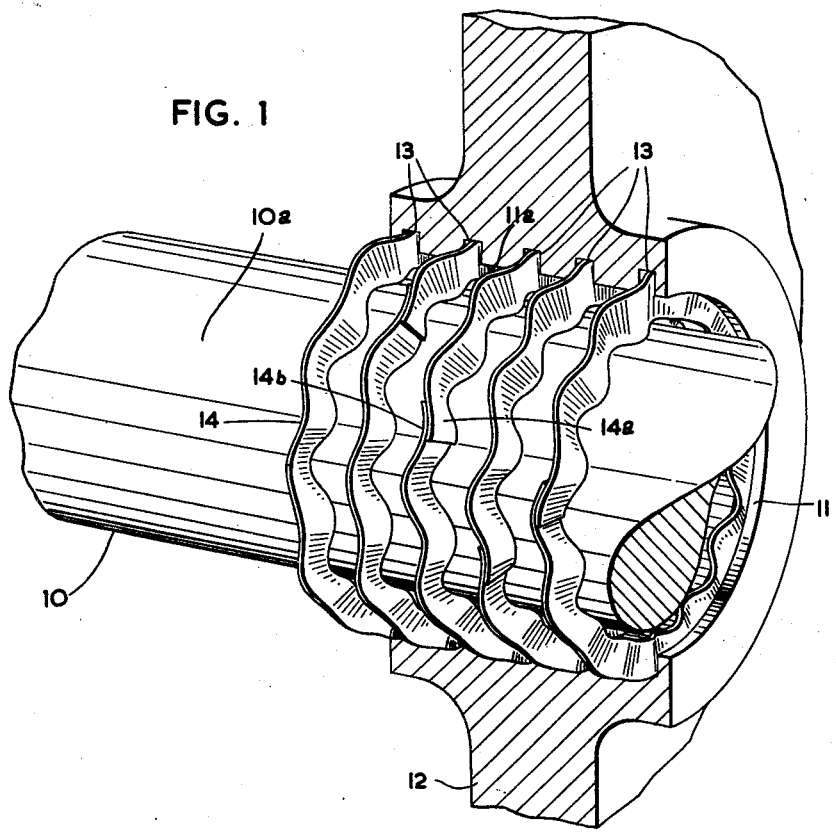

July 26, 1960   P. D. COMERY   2,946,609
LABYRINTH SEAL
Filed April 8, 1958

INVENTOR
P. D. COMERY
BY Maybee & Legris
ATTORNEYS

United States Patent Office 2,946,609
Patented July 26, 1960

2,946,609

LABYRINTH SEAL

Peter Dennis Comery, Cooksville, Ontario, Canada, assignor to Orenda Engines Limited, Malton, Ontario, Canada, a corporation of Canada Filed Apr. 8, 1958, Ser. No. 727,088

1 Claim. (Cl. 286—10)

The present invention relates to packings or seals of the labyrinth type which are used to prevent leakage between relatively rotating members.

In various places in gas and steam turbine engines and similar rotary power conversion machines, in which vapour or gas is used as the working fluid, it is often necessary to provide seals between the relatively rotating parts or members in order to provide a barrier to the passage of high pressure gas into regions of relatively lower pressure. Because of the high differential in speeds between adjacent relatively rotating parts in such engines it is customary to use seals of the labyrinth type which are well known in the art. Labyrinth seals consist essentially of a series of axially spaced annular baffles or rings mounted on either of the relatively rotating parts and extending towards the other part so that the space between the periphery of the annular seal elements and the adjacent surface is as small as is practical. The high pressure gas or vapour passing through this space at each ring experiences a drop in pressure so that after passing the successive rings which constitute the seal, the pressure of the gas or vapour has fallen substantially to the pressure of the gas on the low pressure side of the seal.

It will be apparent from the preceding description that it is advantageous for the space between the free edge of the seal element and the adjacent surface to be as small as possible. In practice, however, the components of all rotary power conversion machines are subject to distortion due to centrifugal forces, temperature variations and, particularly in the case of gas turbine engines used to power aircraft, to acceleration and gyroscopic forces necessitating certain minimum clearances between the rings and the adjacent relatively rotating surfaces so as to avoid excessive rubbing contact.

In gas turbine engines of the type commonly used to propel present day aircraft, weight is of extreme importance and, therefore, it is desirable that a labyrinth seal should increase the weight of the engine as little as possible.

In these engines it is also desirable that the labyrinth seal be so constructed that should contact be made between the seal elements and the adjacent surface due to distortion of the parts under the influence of centrifugal force, temperature variations, acceleration or gyroscopic forces, no serious damage will result to either the seal or the surface.

It is, therefore, an object of the present invention to provide a labyrinth seal in which the glands or rings can be constructed of relatively thin material to reduce weight and, at the same time, provide a stiff structure to withstand the distorting forces normally encountered in operation.

It is a further object of this invention to provide a seal including seal elements which, should they come in contact with a rotating surface, will distribute the rubbing load over a relatively wide area and will, therefore, reduce the tendency to cause excessive wear in the surface.

Figure 2:
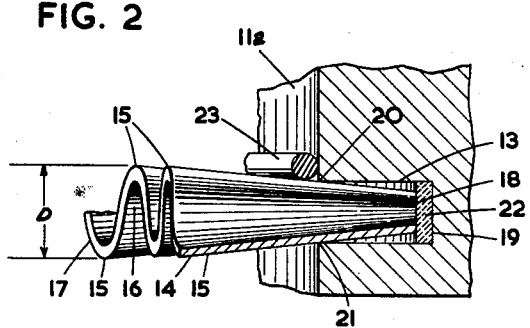

The means for realizing the objects outlined above and the advantages which are obtained by the labyrinth seal which is the subject of this invention will be apparent from the following description of the preferred embodiment when read in conjunction with the appended drawings in which like reference numerals denote like parts in the various views and in which:

Figure 1 is a perspective view of a labyrinth seal in accordance with this invention with a portion broken away to show the construction, and Figure 2 is a detailed sectional view taken along line 2—2 of Figure 1.

Referring now to the drawings and, in particular to Figure 1, the invention will be seen to include a shaft 10 which passes through an aperture 11 in a structural member 12 the nature of which, for the purposes of the present invention, is immaterial. The shaft 10 has an external surface 10a which is a surface of revolution and which is coaxial with, parallel to and closely spaced from the internal surface of revolution 11a of the aperture 11 in the structural member 12.

In the embodiment illustrated in the drawings a plurality of annular grooves 13 are cut in the surface 11a of the aperture 11, each groove 13 being axially spaced from the adjacent grooves. As will subsequently appear, the grooves could alternatively be cut in the surface 10a of the shaft 10.

In each of the grooves 13 there is seated an annular seal element 14 which extends from the bottom of the groove 13, past the surface 11a of the aperture 11 towards the surface 10a of the shaft 10. Each of the seal elements 14, as seen in Figure 1, is formed with crimps extending from one edge of the seal element to the other, the extent to which the material from which the seal element is made is distorted adjacent the radially inner edge of the seal element being greater than adjacent the radially outer edge of the seal element. By this means a straight strip of material can be caused to conform to a desired radius and assume the annular form shown in Figure 1. The ends 14a and 14b of each seal element 14 overlap with one another slightly and are not secured together but are free to move relative to one another to accommodate expansion and contraction in the seal element without reducing the diameter of the aperture defined by the annular seal elements 14, beyond that reduction which is caused by the contraction of the structural member 12 itself.

In a labyrinth seal of the type shown in Figure 1 there may be as many seal elements 14 as is considered necessary having regard to the conditions under which the seal is to be employed. It is convenient to disclose five seal elements in the drawings but, of course, a smaller or larger number may be employed if desired.

Referring now to Figure 2 which is a detailed sectional view taken along line 2—2 of Figure 1 the method of securing each seal element 14 in position in its groove 13 cut in surface 11a will be described. Firstly, a straight strip of sheet metal is crimped to provide laterally displaced crests 15 and troughs 16 as shown in Figure 2, the material being displaced to a greater extent adjacent the radially inner edge 17 of the seal element 14 than adjacent the radially outer edge 18 of the seal element 14. In this manner the strip is caused to conform to a desired radius, the "at rest" radius of the seal elements 14, in the embodiment disclosed in the drawings, being slightly greater than the radius of the base 19 of the grooves 13 so that when the seal elements are placed in the position shown in Figure 1 their natural resiliency will tend to force them into firm engagement and abutment with the bottom 19 of the grooves 13. Similarly, the width of the grooves 13 is chosen so that the crests 15 of the crimped seal element 14 will just contact the edges of the groove at points 20 and 21 as seen in Figure 2.

In order to secure the seal elements 14 in position a brazing compound 22 is placed in the bottom of groove 13, the seal element 14 placed in position and the entire assembly heated to brazing temperature in a brazing furnace. The radially outer edge 18 of the seal element 14 will, accordingly, be firmly brazed to the bottom 19 of the groove 13 to provide a rigid mechanical connection between the supporting structure 12 and the seal element 14. Alternatively, a wire or similar piece of brazing material 23 may be placed on the surface 11a of the aperture 11 in the structural member 12 immediately adjacent the edge 20 of the groove 13 as shown in Figure 2. When the assembly is heated to brazing temperature in a brazing oven, the brazing material 23 will melt, and, due to the capillary action between the crests 15 and the side wall of the groove 13, will be drawn into the groove 13 to securely braze the seal element 14 into the groove 13.

The edge 17 of the seal element 14 will be the edge which will approach the surface 10a of the shaft 10 when the seal is assembled with the shaft as shown in Figure 1. Accordingly, it will be seen that should rubbing contact between the surface 10a of the shaft and edge 17 of the seal element 14 take place, the rubbing load will be distributed over the distance represented by the arrow D in Figure 2, thus distributing the rubbing contact over an area sufficiently great to prevent excessive damage to the shaft at the point of contact. Similarly, the seal itself will be less likely to be bent and otherwise damaged due to the rubbing contact.

The use of a crimped strip of the type contemplated by this invention enables a relatively light weight sheet metal to be used since the crimping of the strip adds considerably to its strength and resistance to displacement in a lateral direction under the influences of gas pressure, rubbing contact and other forces commonly encountered in operation. In addition it simplifies the manufacture of the seal since the seal element can be constructed from straight strips of material which can be formed on inexpensive equipment. Further, the waste material is very much reduced since many strips can be cut from a sheet of material which could produce only one annular stamping.

A further advantage accrues from the fact that the edge 17 of the finished seal may be more readily machined to a truly circular configuration than is the case when a seal element is made from a truly annular piece of material which lies substantially in a plane. This is due to the fact that the seal element 14, in its crimped form, possesses much greater resistance to distortion than does such a planar seal element and, accordingly, may be more readily machined by any of the conventional machining methods used to produce seals of this type.

The foregoing description is believed to present a labyrinth seal and seal element which possesses the advantages outlined and although the invention has been described with reference to a preferred embodiment it is intended that this embodiment be construed as illustrative of the invention, the scope of the invention being defined in the appended claim.

What I claim as my invention is:

A labyrinth seal comprising two relatively rotating parts having spaced parallel surfaces of revolution, a series of annular grooves in one surface, each groove being axially spaced from the adjacent grooves, an annular seal element secured in each groove in the one surface and extending towards the other surface, each seal element comprising a strip of sheet metal of annular form with its ends in overlapping, unconnected relationship, of a thickness less than the width of each groove, each seal element having crimps extending from one edge of the strip to the other to provide laterally displaced crests and troughs in the strip of greater depth adjacent the radially inner edge of the seal element than adjacent its radially outer edge, the width of each groove being such that the crests of the crimps contact the edges of the grooves when the seal elements are seated in the grooves thereby providing, in association with the side wall of each groove, areas of capillary attraction for molten brazing material to secure the seal elements in the grooves.

References Cited in the file of this patent

UNITED STATES PATENTS

| | | |
|---|---|---|
| 945,180 | Ljungstrom | Jan. 4, 1910 |
| 1,357,739 | Steenstrup | Nov. 2, 1920 |
| 1,915,113 | Wood et al. | June 20, 1933 |
| 2,871,038 | Comery | Jan. 27, 1959 |

FOREIGN PATENTS

| | | |
|---|---|---|
| 18,478 | Great Britain | of 1906 |